United States Patent
Zheng et al.

(10) Patent No.: US 11,416,451 B2
(45) Date of Patent: Aug. 16, 2022

(54) METHOD AND SYSTEM TO PREFETCH DATA IN DATABASES

(71) Applicant: ALIBABA GROUP HOLDING LIMITED, Grand Cayman (KY)

(72) Inventors: Fang Zheng, San Mateo, CA (US);
Ruiping Li, San Mateo, CA (US);
Cheng Zhu, San Mateo, CA (US);
Congnan Luo, San Mateo, CA (US);
Huaizhi Li, San Mateo, CA (US);
Xiaowei Zhu, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/730,796

(22) Filed: Dec. 30, 2019

(65) Prior Publication Data
US 2021/0200718 A1    Jul. 1, 2021

(51) Int. Cl.
*G06F 16/172* (2019.01)
*G06F 16/903* (2019.01)

(52) U.S. Cl.
CPC ...... *G06F 16/172* (2019.01); *G06F 16/90335* (2019.01)

(58) Field of Classification Search
CPC ............. G06F 16/172; G06F 16/90335; G06F 16/221; G06F 16/2282; G06F 16/24552; G06F 16/24539; G06F 16/24557; G06F 16/24561; G06F 16/24562; G06F 16/24553; G06F 16/24556; G06F 12/0862; G06F 9/383; G06F 9/30047; G06F 2216/13; G06F 2212/6028; G06F 2212/6026; G06F 2212/6022; G06F 2212/602; G06F 16/24; G06F 16/244; G06F 16/2445; G06F 16/245; G06F 16/2453; G06F 16/24534; G06F 12/207; G06F 3/0644; G06F 16/285

See application file for complete search history.

(56) References Cited

U.S. PATENT DOCUMENTS

| | | | |
|---|---|---|---|
| 9,058,357 B1 * | 6/2015 | Birnbaum | G06F 16/24552 |
| 9,922,090 B1 * | 3/2018 | Zukowski | G06F 16/221 |
| 10,445,076 B1 * | 10/2019 | Legler | G06F 16/221 |
| 2012/0054225 A1 * | 3/2012 | Marwah | G06F 16/2457 707/769 |
| 2012/0084278 A1 * | 4/2012 | Franke | G06F 16/28 707/719 |
| 2013/0254246 A1 * | 9/2013 | Li | G06F 16/182 707/823 |

(Continued)

OTHER PUBLICATIONS

Abadi et al., Query Execution in col. Oriented Database Systems, Published Dissertation available online 2008 (Year: 2008).*

(Continued)

*Primary Examiner* — David T. Brooks
(74) *Attorney, Agent, or Firm* — Finnegan, Henderson, Farabow, Garrett & Dunner, LLP

(57) ABSTRACT

The present disclosure provides systems and methods for prefetching data in databases. One method for prefetching data in a database comprises receiving a database query on the database, determining one or more sets of adjacent columns access by the database query, and for each set of adjacent columns of the one or more determined sets, prefetching data in the adjacent columns.

20 Claims, 8 Drawing Sheets

(56) References Cited

U.S. PATENT DOCUMENTS

| | | | |
|---|---|---|---|
| 2015/0084970 A1* | 3/2015 | Schaub | H04N 19/436 345/506 |
| 2015/0186410 A1* | 7/2015 | Petculescu | G06F 16/221 707/823 |
| 2015/0213107 A1* | 7/2015 | Park | G06F 16/2365 707/602 |
| 2016/0098446 A1* | 4/2016 | Dickie | G06F 16/2465 707/769 |
| 2019/0339954 A1* | 11/2019 | Legler | G06F 16/24552 |

OTHER PUBLICATIONS

Greenplum downloaded from https://en.wikipedia.org/wiki/Greenplum, 4 pages (2019).

Greenplum downloaded from https://github.com/greenplum-db/gpdb, 8 pages(2019).

Abadi et al., "The Design and Implementation of Modem Column-Oriented Database Systems," Foundations and Trends in Databases, vol. 5 No. 3, pp. 197-280 (2012).

\* cited by examiner

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

(A)

| ID | LastName | FirstName | Salary |
|---|---|---|---|
| 100 | Smith | Joe | 20000 |
| 101 | Jones | Cathy | 50000 |
| 102 | Johnson | Mary | 90000 |
| 103 | Hank | Tom | 33000 |
| 104 | Levis | Jerry | 44000 |
| 105 | Rivers | Andy | 66000 |

| ID  | LastName | FirstName | Salary |
|-----|----------|-----------|--------|
| 100 | Smith    | Joe       | 20000  |
| 101 | Jones    | Cathy     | 50000  |
| 102 | Johnson  | Mary      | 90000  |
| 103 | Hank     | Tom       | 33000  |
| 104 | Levis    | Jerry     | 44000  |
| 105 | Rivers   | Andy      | 66000  |

Scan (ID, Salary) with predicate: Salary > 40000

| ID  | Salary |
|-----|--------|
| 101 | 50000  |
| 102 | 90000  |
| 104 | 44000  |
| 105 | 66000  |

METHOD AND SYSTEM TO PREFETCH DATA IN DATABASES

BACKGROUND

Increasing the sizes of databases has allowed for big data analysis, which is unlocking potentials in data and data querying. Many companies have developed database querying techniques to allow for quicker and more efficient scanning of large amounts of data. One of the techniques is data prefetching.

While data prefetching can improve the overall efficiency of executing database queries, it has its drawbacks. For example, many of the database prefetching techniques are designed for row-oriented storage. As a result, they are not suitable for column-oriented storage or row-column hybrid storage. Moreover, many of the database prefetching techniques have a tendency to prefetch unnecessary columns into memory, because the prefetching techniques fail to take advantage of column information provided in the database query, such as the database query's predicates or projections. In addition, many of the database prefetching techniques fail to take advantage of metadata for the columns, which can contain valuable information on which columns or blocks of data to fetch.

SUMMARY

Embodiments of the present disclosure provides a method for prefetching data in databases. The method comprises receiving a database query on the database; determining one or more sets of adjacent columns accessed by the database query; and for each set of adjacent columns of the one or more determined sets, prefetching data in the adjacent columns.

Optionally, the method further comprises determining if there is a current block of data to be processed; in response to a determination that there is a current block to be processed, reading each set of adjacent columns in the current block, and determining if there is a next block of data to be processed, wherein the next block is located next to the current block in the database; and in response to a determination that there is a next block to be processed, prefetching data in each set of adjacent columns in the next block and setting the next block as the current block.

Optionally, the method further comprises processing metadata of the blocks to determine if there is a current block to be processed, and processing metadata of the blocks to determine if there is a next block to be processed.

Moreover, embodiments of the present disclosure provide database systems for prefetching data in databases. The database system comprises a memory and a processor configured to prefetch data by receiving a database query on the database; determining one or more sets of adjacent columns accessed by the database query; and for each set of adjacent columns of the one or more determined sets, prefetching data in the adjacent columns.

Optionally, the processor is further configured to prefetch data by determining if there is a current block of data to be processed; in response to a determination that there is a current block to be processed, reading each set of adjacent columns in the current block, and determining if there is a next block of data to be processed, wherein the next block is located next to the current block in the database; and in response to a determination that there is a next block to be processed, prefetching data in each set of adjacent columns in the next block and setting the next block as the current block.

Optionally, the processor is further configured to prefetch data by processing metadata of the blocks to determine if there is a current block to be processed, and processing metadata of the blocks to determine if there is a next block to be processed.

Moreover, embodiments of the present disclosure also provide non-transitory computer readable media that store a set of instructions that are executable by one or more processors of an apparatus to perform a method for prefetching data in databases. The method comprises receiving a database query on the database; determining one or more sets of adjacent columns accessed by the database query; and for each set of adjacent columns of the one or more determined sets, prefetching data in the adjacent columns.

Optionally, the method further comprises determining if there is a current block of data to be processed; in response to a determination that there is a current block to be processed, reading each set of adjacent columns in the current block, and determining if there is a next block of data to be processed, wherein the next block is located next to the current block in the database; and in response to a determination that there is a next block to be processed, prefetching data in each set of adjacent columns in the next block and setting the next block as the current block.

Optionally, the method further comprises processing metadata of the blocks to determine if there is a current block to be processed, and processing metadata of the blocks to determine if there is a next block to be processed.

BRIEF DESCRIPTION OF THE DRAWINGS

The accompanying drawings, which are incorporated in and constitute a part of this specification, illustrate embodiments consistent with the invention and, together with the description, explain the principles of the invention.

FIG. 1 illustrates exemplary formats of storing data in a database.

DETAILED DESCRIPTION

Figure 2:
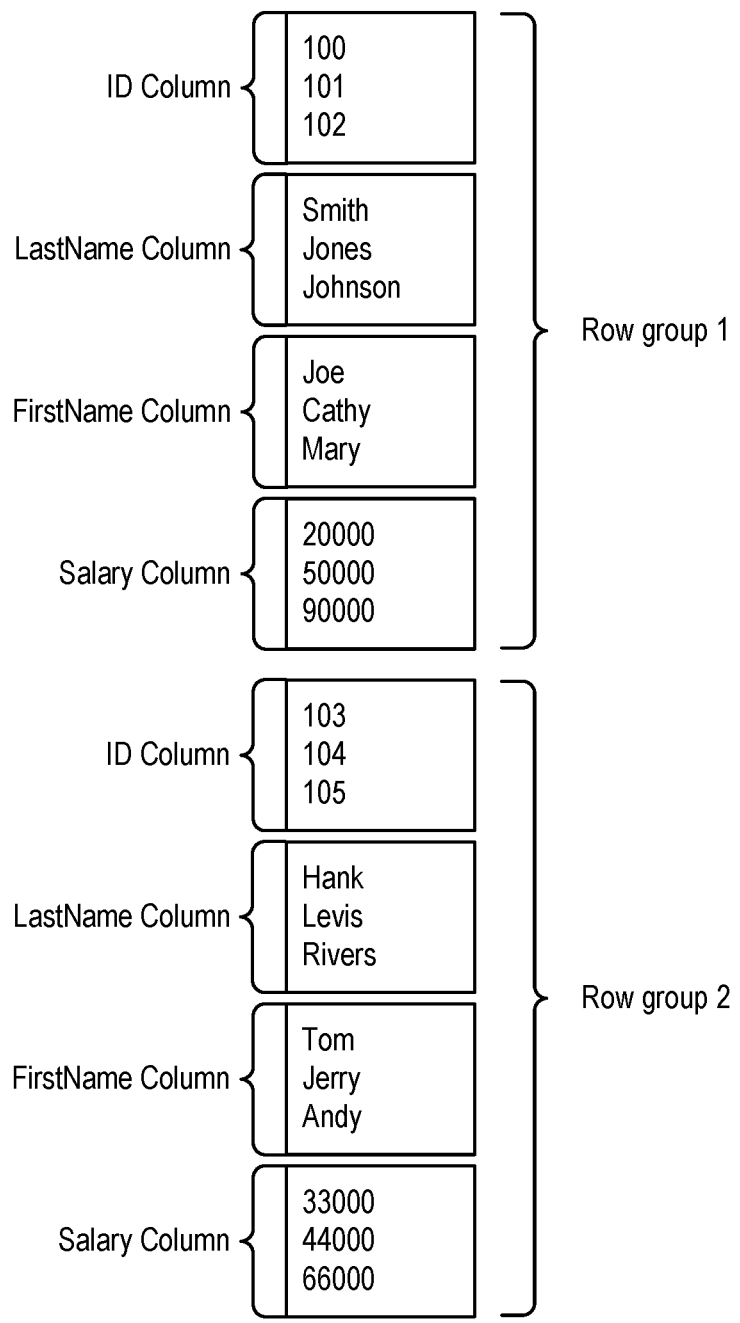
FIG. 2 illustrates an exemplary format of row-column hybrid storage in a database.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Many of the modern databases are columnar databases, which store data in columns rather than in rows. FIG. 1 illustrates exemplary formats of storing data in a database. As illustrated in FIG. 1(A), data can be logically represented as a two-dimensional table, which comprises columns and rows. The table shown in FIG. 1(A) has four columns and six rows. The columns are named "ID," "LastName," "First-Name," and "Salary." Data shown in the table can be stored in a number of ways. One way is called row-oriented storage. In row-oriented storage, data is stored row by row, and all the columns of a single row are physically placed together, similar to those shown in FIG. 1(A). The row-oriented storage is used for efficient access of data located in the same row. For example, if a user of a database system wishes to retrieve all column information associated with an entry "100" in the "ID" column, the user can easily retrieve entries "Smith," "Joe," and "20000" from the storage since these entries are physically stored together. Row-oriented storage is commonly used for transactional queries, such as online transactional processing ("OLTP").

Another way to store data is called column-oriented storage. In column-oriented storage, data is stored column by column, and all the rows of a single column are physically placed together. As shown in FIG. 1(B), each column is saved in a separately. For example, all entries in the "ID" column are saved together. Each column is usually further divided into blocks and each block is stored in compressed form. During query processing, data is read back from storage into memory in units of blocks.

The column-oriented storage is used to efficiently support analytical queries that are often interested in a subset of one or more columns. With the column-oriented storage, data of a particular column or a few columns can be retrieved without wasting input/output ("I/O") bandwidth on columns that are not needed. In addition, column-oriented storage can allow for more efficient data compression because data in a column is typically of a same type. Column-orientated storage has demonstrated an ability to provide significant saving on I/O cost for many analytical queries, including online analytical processing ("OLAP").

In many database systems featuring the column-oriented storage, data of all columns of a single row are spread out across the storage disk or multiple storage disks. For example, a block of data can be stored in a specific location on a disk storage, and other blocks of data may be stored in other locations that are not physically adjacent. As a result, accessing a particular row will require accessing multiple disk blocks spread across the storage disk or multiple storage disks, which can cause significant delay. Unfortunately, many typical OLTP queries often request such operations.

To address this inefficiency, some database systems adopt a row-group columnar storage or row-column hybrid storage. It first divides rows into row groups. A row group can also be referred to as a block. The rows can also be referred to as tuples. The column-oriented storage is then used for each block. FIG. 2 illustrates an exemplary format of row-column hybrid storage in a database. On the basis of the data illustrated in FIG. 1, the row-column hybrid storage of FIG. 2 divides up the data into two blocks named row group 1 and row group 2. Row group 1 comprises the first three rows of data, and row group 2 comprises the next three rows of data. Data in each row group is then stored according to the column-oriented storage.

Depending on the size of the row groups, accessing a particular row in a row-column hybrid storage can request fewer data blocks than the pure column-oriented storage, because the column entries of a row are now located closer to each other. As a result, the row-column hybrid storage can perform well for OLTP queries. At the same time, the row-column hybrid storage still gets a great deal of benefit of the column-oriented storage that is applied to each row group, because data inside each row group is still stored in a column-oriented storage. Therefore, the row-column hybrid storage is often a good option for a mixed workload of OLTP and OLAP. In the following description, column-oriented storage is used to describe pure column-oriented storage and its row-column variant, and row-group column storage and row-column hybrid storage are used interchangeably.

Figure 3:
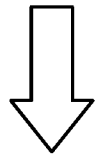
FIG. 3 illustrates an exemplary scan operation in a database.

A scan operation is a primitive operation in database queries. A scan operation takes as input a table, and optionally a set of projected columns and a set of predicates, and outputs a set of projected rows in a database table that satisfies the given predicates. A predicate can be a conditional expression that evaluates to a Boolean value. FIG. 3 illustrates an exemplary scan operation in a database. According to FIG. 3, the scan has a predicate "Salary>40000" and a projection of (ID, Salary). To perform the scan operation, each row of the table is examined to check if the row satisfies the predicate. If the row satisfies, the selected columns in the projection is outputted. For example, the salary column in the second row reads 50000, which satisfies the "Salary>40000" predicate. As a result, (101, 50000) is outputted.

In column-oriented storage, a scan operation can involve reading projected column data from disk files into memory and performing the predicate evaluation. In the example shown in FIG. 2, the scanning operation involves loading the entire columns of "ID" and "Salary" from storage disk into memory. In the row-column hybrid storage example shown in FIG. 3, the scan operation involves loading data from the "ID" and "Salary" columns from each block while skipping other columns.

I/O prefetching is a process of reading data from storage disks that are needed for computation in the future. When a database process needs some data for processing and that data is not available in the database's memory, the database process has to read the data from a storage disk and wait for the data to be brought into memory before it can perform computation on the data. As a result, if the needed data can be read ahead of time, I/O prefetching can effectively reduce computation time for the database, hence making database processes more efficient.

I/O prefetching can be implemented in several ways inside databases. One way is to leverage a readahead and prefetching capability from the database's underlying operating system. For example, Linux kernel provides readahead capability that can bring next few blocks of data relative to current data being processed into page cache. The Linux kernel also offers a posix_fadvise( ) system call that allows applications to request the operating system to asynchronously read a specific piece of file contents into page cache.

Aside from support at the operating system level, I/O prefetching may also be implemented at an application level. For example, an application may use one or more dedicated I/O threads to pre-fetch data for future use while a main thread is processing the current data.

In many of the modern large-scale database systems, the data systems can be deployed on thousands of machines, and millions of analytical queries are routinely executed every day over peta-bytes of data that are stored across different machines and storage disks. These analytical queries can be either OLAP or OLTP. As a result, to handle the mixed workload at a peta-byte scale, large scale database systems can use a row-column hybrid storage. When an analytical query like the scan operation is performed on a large table, a significant amount of time is spent in reading data from disk storages. Therefore, I/O prefetch can be an effective approach to reduce I/O latency during the scan operation and improve overall query performance.

While I/O prefetching can provide benefits in access efficiency for databases, many of the existing I/O prefetching technologies focus on either row-oriented storage or column-oriented storage, and they are not very suitable to be implemented for row-column hybrid storage. For example, some database systems implement I/O prefetching for scan operations in column-oriented storage by adjusting prefetching rate for each column, since columns can have different data types and hence different data size. These database systems invest valuable computing resources to monitor block faults and evictions to ensure that prefetching rate is aggressive enough to keep up with query processing while avoiding loading data that is too far away to end up being evicted before being used. As a result, these database systems still place a significant burden on computing resources.

In another example, operating systems such as Linux may automatically apply readahead to prefetch data during a scan operation in some scenarios, but they fall short in a general case when projection of columns and early filtering are present in the scan operation. Both projection and early filtering can signal that many columns or blocks are not required to be read. Unfortunately, prefetching at the operating system level often cannot take full advantage of these signals. As a result, prefetching at the operating system level is very limited in improving performance of query execution. There is a need to develop a light weight solution to perform I/O prefetching on row-column hybrid storage that do not add excessive burden on computing resources.

Figure 4:
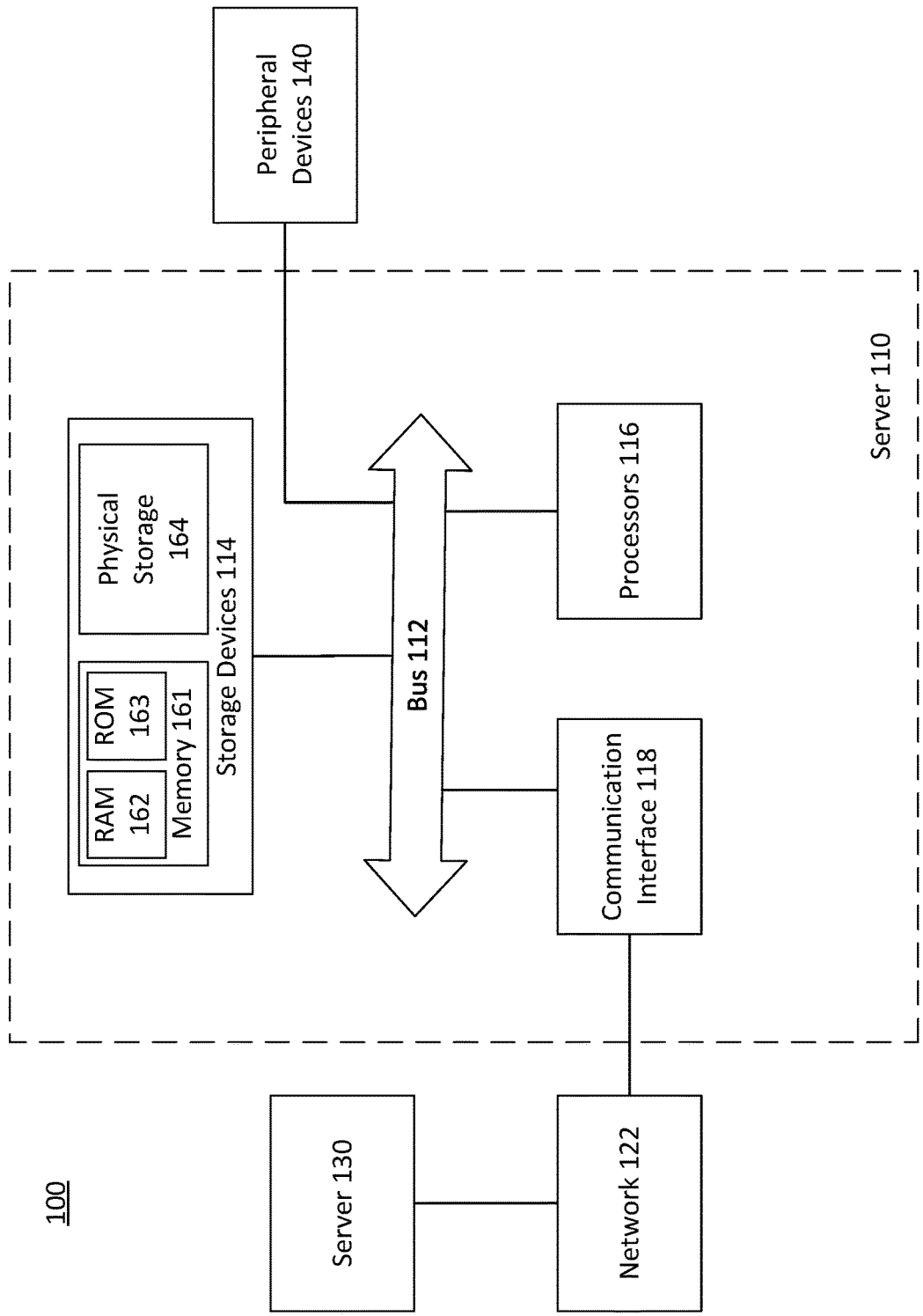
FIG. 4 illustrates a schematic diagram of an exemplary server of a database system, according to some embodiments of the present disclosure.

Embodiments of the present disclosure resolve these issues by providing novel systems and methods for I/O prefetching to accelerate scan operations in a database. FIG. 4 illustrates a schematic diagram of an exemplary server of a database system, according to some embodiments of the present disclosure. According to FIG. 4, server 110 of database system 100 comprises a bus 112 or other communication mechanism for communicating information, and one or more processors 116 communicatively coupled with bus 112 for processing information. Processors 116 can be, for example, one or more microprocessors. In some embodiments, database system 100 can be an OLAP database or an OLTP database.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Figure 5:
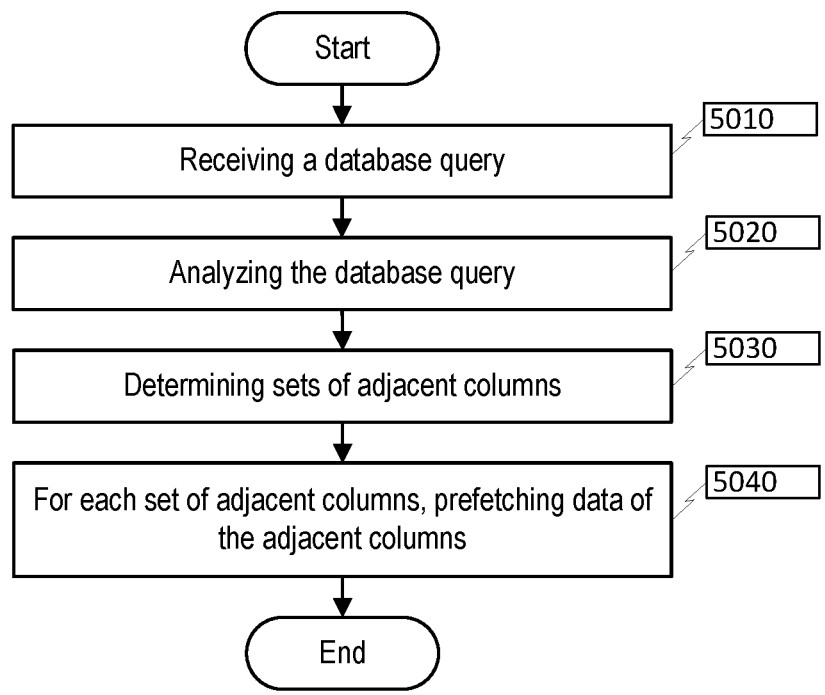
FIG. 5 illustrates a flowchart of an exemplary method for prefetching data based on a database query, according to some embodiments of the disclosure.

Embodiments of the present disclosure provide methods for prefetching data based on a query on a database. FIG. 5 illustrates a flowchart of an exemplary method for prefetching data based on a database query, according to some embodiments of the disclosure. It is appreciated that method 5000 of FIG. 5 may be performed by a database system (e.g., database system 100 of FIG. 4) or a server (e.g., server 110 of FIG. 4).

In step 5010, a database query is received. In some embodiments, the database query is inputted by a user of the database system, or a system call from the database system. The user or the database system seeks to retrieve data from the database according to the database query. In some embodiments, the database query is a scan operation. In some embodiments, the database query comprises a predicate (e.g., predicate "Salary>40000" of FIG. 3) or a projection (e.g., projection (ID, Salary) of FIG. 3). It is appreciated that step 5010 may be performed by peripheral devices 140 or processors 116 of FIG. 4.

In step 5020, the received database query is analyzed. In some embodiments, the database query is analyzed to determine which columns the database query reads. In some embodiments, the database query is analyzed to determine whether a database query comprises a predicate or a projection. If the database query comprises a predicate or a projection, the columns referenced in the predicate or the projection are collected as the columns that the database query reads. It is appreciated that step 5020 can be performed by processors 116 or server 110 of FIG. 4.

In step 5030, one or more sets of adjacent columns are determined from the database query. When the database query accesses multiple columns in the database, the accessed columns that are adjacent to each other can be grouped together to form a set of adjacent columns. For example, if a scan operation has a projection of columns 1, 3, 4, 6, 7, and 8, then there are in total three sets of adjacent columns: {1}, {3, 4}, and {6, 7, 8}. It is appreciated that step 5030 can be performed by process 116 or server 110 of FIG. 4.

In step 5040, data in the adjacent columns in each set is prefetched into memory. For example, for the set of adjacent columns {3, 4}, when column 3 is being processed, data in column 4 can be prefetched into memory. When the set of adjacent columns {3, 4} is prefetched, the next set of adjacent columns {6, 7, 8} can also be prefetched. In some embodiments, adjacent columns are prefetched until a size of the prefetched data reaches a maximum read buffer size. For example, for the set of adjacent columns {6, 7, 8}, if the read buffer size of the database system can only hold adjacent columns 6 and 7, then adjacent column 8 is not read into memory until the database system finishes processing prefetching of adjacent columns 6 and 7. In some embodiments, adjacent columns that are prefetched into a read buffer are decompressed. The adjacent columns can be decompressed one by one. In some embodiments, data in the adjacent columns in each set is prefetched from a storage (e.g., physical storage 164 of FIG. 4).

In some embodiments, the prefetching in step 5040 can be processed using a readahead and prefetching capability from the database system's underlying operating system. After one or more sets of adjacent columns are determined from the database query, the database system can determine a location in the storage (e.g., physical storage 164 of FIG. 4) where the data in the adjacent columns are stored. The database system can then invoke a prefetching command of the underlying operating system using the determined location. For example, operating system Linux offers data prefetching capability in its command posix_fadvise( ) which may ask for as input an offset and a size of data to prefetch. The database system can determine the offset according to the location of the adjacent columns, and the size of data according to the size of the adjacent columns or the maximum read buffer size.

Method 5000 of FIG. 5 has an advantage that adjacent columns may only be prefetched. In other words, columns that are not accessed by the query operations do not take valuable I/O resources reserved for prefetching. For example, in the scan operation with the projection of columns 1, 3, 4, 6, 7, and 8, columns that are not accessed by the scan operation, such as columns 2 and 5, are not prefetched in step 5040. By not prefetching columns 2 and 5, database systems can improve their prefetch efficiency. Another advantage of method 5000 of FIG. 5 is that adjacent columns can be prefetched together. Prefetching adjacent columns can avoid unnecessary jumps in data prefetching, since adjacent columns are usually physically stored together in a columnar storage or row-column hybrid storage.

Figure 6:
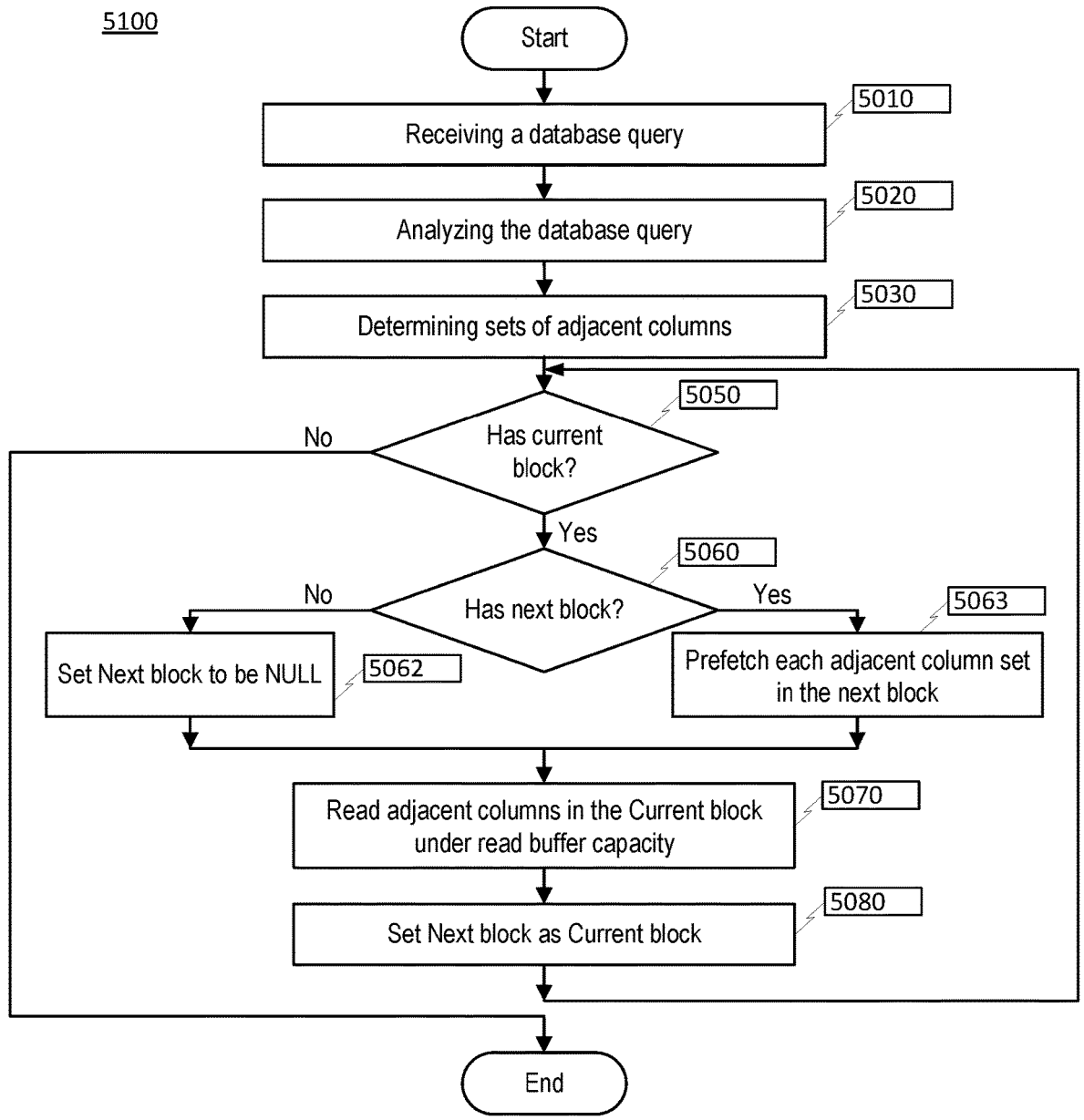
FIG. 6 illustrates a flowchart of an exemplary method for prefetching data in data blocks based on a database query, according to some embodiments of the disclosure.

In some embodiments, database systems have a row-column hybrid storage, and data is stored in units of row groups (or blocks) in the database system. FIG. 6 illustrates a flowchart of an exemplary method for prefetching data in row groups based on a database query, according to some embodiments of the disclosure. On the basis of method 5000 of FIG. 5, method 5100 of FIG. 6 further comprises steps 5050, 5060, 5062, 5063, 5070, and 5080. In some embodiments, method 5100 of FIG. 6 can be executed on database systems that have row-column hybrid storage similar to the format illustrated in FIG. 2. It is appreciated that method 5100 of FIG. 6 may be performed by a database system (e.g., database system 100 of FIG. 4) or a server (e.g., server 110 of FIG. 4).

Step 5050 is executed after step 5030, where the adjacent columns are determined from the database query. In step 5050, it is determined whether there is a current block to be processed. In some embodiments, blocks are processed according to their order in the original file. For example, as shown in FIG. 2, the file is divided into two row groups (or blocks) in the order of row group 1 and row group 2. Row group 1 can be processed first before row group 2. When sets of adjacent columns have been determined in step 5030, the database system can start processing blocks by treating the first block in storage as the current block. For example, as shown in FIG. 2, after the database system has determined the sets of adjacent columns (e.g., column "ID" and column "Salary"), the database system can start processing blocks by treating row group 1 as the current block. If it is determined that there is a current block to be processed, step 5060 is executed. If it is determined that there is no more current block to be processed, method 5100 ends.

In step 5060, it is determined whether there is a next block to be processed. In some embodiments, the next block is the block that is next to the current block in the original file. For example, as shown in FIG. 2, if the current block is row group 1, row group 2 is then the next block. If the current block is row group 1, and there is no more data blocks in storage, then there is no more next block to be processed. If it is determined that there is no more next block to be processed, step 5062 is executed. In step 5062, after it is determined that there is no more next block to be processed, the next block is set to null, and step 5070 is executed.

If it is determined that there is a next block in step 5060, step 5063 is executed. In step 5063, after it is determined that there is a next block to be processed, each set of adjacent columns in the next block is prefetched into memory. In some embodiments, the prefetching of each set of adjacent columns is analogous to step 5040 of method 5000 in FIG. 5, with the exception that the prefetching in step 5063 is within the boundary of the next block. In some embodiments, the prefetching in step 5063 can be processed using a readahead and prefetching capability from the database system's underlying operating system. After one or more sets of adjacent columns are determined from the database query and the next block is set, the database system can determine a location in the storage (e.g., physical storage 164 of FIG. 4) where the blocks containing data in the adjacent columns are stored. The database system can then invoke a prefetching command of the underlying operating system using the determined location. For example, operating system Linux offers data prefetching capability in its command posix_fadvise( ) which may ask for input an offset and a size of data to prefetch. The database system can determine the offset according to the location of the adjacent columns in the next block, and the size of data according to the size of the adjacent columns in the next block.

In step 5070, each set of adjacent columns in the current block is read from either a memory (e.g., memory 161 of FIG. 4) or a storage (e.g., physical storage 164 of FIG. 4). In some embodiments, adjacent columns are read until a size of the read data reaches a maximum read buffer size. For example, for the set of adjacent columns {6, 7, 8} in the current block, if the read buffer size of the database system can only hold adjacent columns 6 and 7 in the current block, then adjacent column 8 in the current block is not read until the database system finishes processing reading of adjacent columns 6 and 7. In some embodiments, adjacent columns that are prefetched into a read buffer is decompressed. The adjacent columns can be decompressed one by one.

In step 5080, the next block is set as a current block. For example, as shown in FIG. 2, if the next block has been set to row group 2, then in step 5080 the current block is set to row group 2. If the next block is set to null in step 5062, then in step 5080 the current block is set to null. After step 5080, step 5050 is executed to determine if there is a current block to be executed.

On top of the advantages offered by method 5000 of FIG. 5, method 5100 of FIG. 6 has an additional advantage in that method 5100 is suitable for database systems that store data in units of blocks (or row groups), such as the row-column hybrid storage. According to method 5100, data blocks can be processed in order. As a result, when a current block is being read, adjacent columns in the next block can be prefetched from storage. When the database system is ready to read the next block, some or all data in the adjacent columns in the next block is already prefetched into memory, hence improving processing efficiency for reading operations when executing database queries.

In some embodiments, database systems can implement metadata structures to accompany data that is stored in row groups (or blocks). Metadata of a data block in a row-column hybrid storage can contain important information for the data block, such as the location of the data stored in the data block in the original file. The metadata of a data block can also contain statistical information about each column in the block, such as minimum and maximum values of each column in the block. If data is compressed when the data is stored into storage, metadata can also comprise information on the compression process, such as the method of compression. In some embodiments, metadata is collected or determined when the data is written into storage. In some embodiments, metadata is stored separately from the data files. For example, the metadata can be stored in auxiliary tables in the database system.

Figure 7:
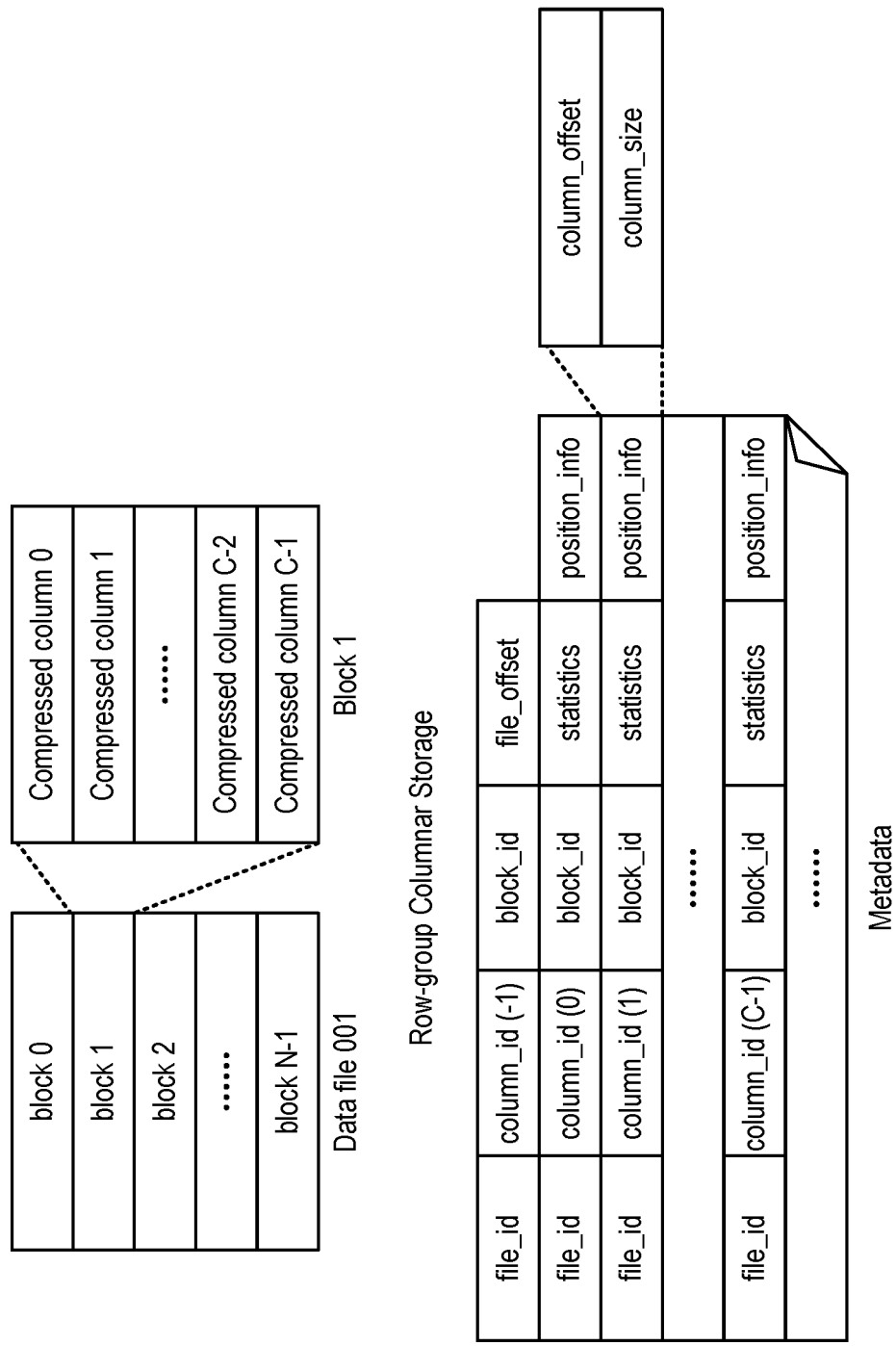
FIG. 7 illustrates an exemplary format of metadata in a row-column hybrid storage, according to some embodiments of the disclosure.

FIG. 7 illustrates an exemplary format of metadata in a row-column hybrid storage, according to some embodiments of the disclosure. According to FIG. 7, data is stored in units of blocks inside data files. For example, data file 001 comprises block 0, block 1, block 2, etc. Inside each block, columns are compressed one by one, and the compressed columns are stored in order. For example, block 1 comprises compressed column 0, compressed column 1, compressed column 2, etc., and the compressed columns are stored in their respective order. The metadata for the compressed columns in the data file is stored in a separate table.

The metadata table of FIG. 7 can comprise five columns, namely file_id, column_id, block_id, statistics or file_offset, and position_info. The file_id column identifies the name of the data file. The column_id column identifies the name of the column. The block_id column identifies the name of the block. The statistics column comprises statistical information of the column identified by the column_id in the block identified in the block_id. The statistical information can comprise minimum and maximum values in the column. The position_info column comprises location information of the column. In some embodiments, the position_info comprises column_offset and column_size. The column_offset entry identifies the relative location of the column inside the block. The column_size entry identifies the size of the column.

For example, the metadata entry for compressed column 1 of FIG. 7 can read as follows. The file_id of compressed column 1 is data file 001. The block_id of compressed column 1 is block 1. The position_info of compressed column 1 can comprise location information of compressed column 1. In some embodiments, the column_offset of compressed column 1 is the relative position of compressed column 1 inside block 1, which is second in the column rankings. If compressed column 1 is analogous to the "ID Column" of "Row Group 1" shown in FIG. 2, then the statistics information of compressed column 1 can comprise the minimum value of 100 and the maximum value of 102. The column_size of compressed column 1 is 3.

In some embodiments, the metadata table can comprise a special row, which identifies locations of data files. For example, as shown in FIG. 7, the first row in the metadata table comprises file_id, column_id (−1), block_id, and file_offset. Since column_id is identified as "−1," the database system can treat this row of metadata as the information for the data file rather than a specific column inside a specific block. This special row of metadata information can identify the locations of data files using file_offset.

Figure 8:
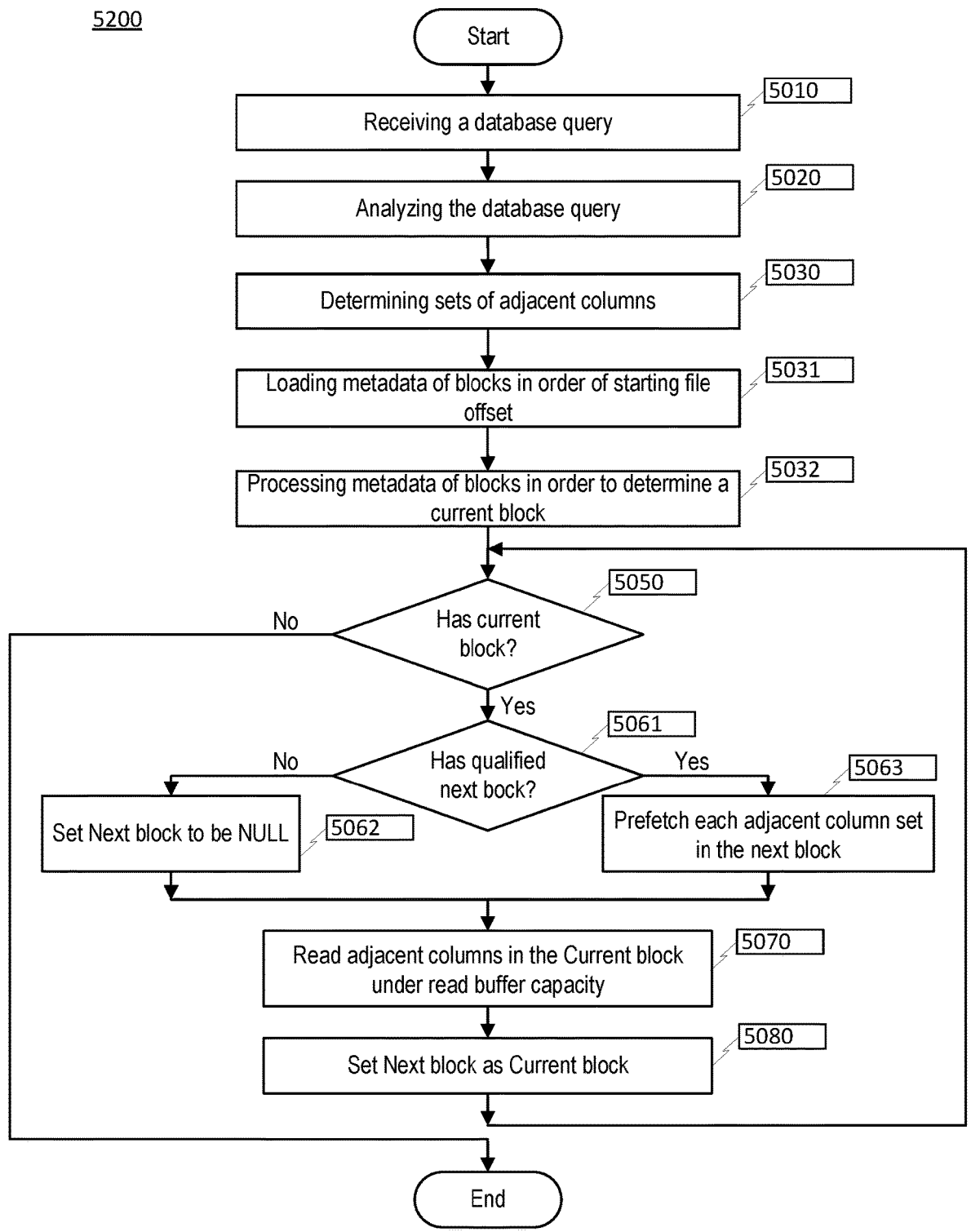
FIG. 8 illustrates a flowchart of an exemplary method for prefetching data in data blocks using metadata, according to some embodiments of the disclosure.

If metadata is available in a database system, the database system can take advantage of the statistical information and location information of each column shown in the metadata table and further improve the efficiency of prefetching data for query execution. FIG. 8 illustrates a flowchart of an exemplary method for prefetching data in data blocks using metadata, according to some embodiments of the disclosure. On the basis of method 5100 of FIG. 6, method 5200 of FIG. 8 further comprises steps 5031, 5032, and 5061. In some embodiments, method 5200 of FIG. 8 can be executed on database systems that have row-column hybrid storage similar to the format illustrated in FIG. 2. In some embodiments, method 5200 of FIG. 8 can be executed on database systems that have metadata format similar to FIG. 7. It is appreciated that method 5200 of FIG. 8 may be performed by a database system (e.g., database system 100 of FIG. 4) or a server (e.g., server 110 of FIG. 4).

Step 5031 is executed after step 5030, where the adjacent columns are determined from the database query. In step 5031, metadata for all blocks is loaded into memory for processing. The metadata can contain location information and statistical information of each column stored in the blocks. In some embodiments, after the metadata is loaded into memory, rows in the metadata table are sorted according to each block's starting file_offset (e.g., "file_offset" of FIG. 7) or each column's offset (e.g., "column_offset" of FIG. 7). For example, the rows in the metadata table can be sorted according to each block's relative location in a physical storage (e.g., physical storage 164 of FIG. 4). If a table has 10 blocks and these 10 blocks are stored in a physical storage one after another, their corresponding rows in the metadata table are sorted so that the relative location of the rows match the relative locations of the 10 blocks in the physical storage.

In step 5032, metadata of each block is processed to determine a current block to process. In some embodiments, metadata of each block is processed in an order of block's starting file_offset. For each block, the database system obtains important information for some or all columns inside the block. The important information can comprise, for example, statistical information or location information of each column. Based on the adjacent columns determined from step 5030, the database system can obtain important information of only the adjacent columns inside the block. The database system can then analyze the statistical information of the adjacent columns inside the block to determine if the block has rows that qualify a predicate of the database query. For example, as shown in FIG. 3, the database query has a predicate of "Salary>40000." If data is organized in a row-column hybrid storage format as shown in FIG. 2, the database system can obtain statistical information for the salary column of row group 1. The statistical information for the salary column may include a maximum value of 20000 and a minimum value of 90000. The database system can then determine that there are one or more rows in row group 1 that satisfy the predicate "Salary>40000" because the maximum value is larger than 40000. If the database query has a predicate of "Salary>95000" instead of "Salary>40000," then the database system can determine that no rows in row group 1 can satisfy the predicate because the maximum value is smaller than 95000.

If the database system determines that there are one or more rows in the block that satisfy a predicate of the database query, the database system can then make the block as the current block, and execute step 5050. If the database system determines that no rows in the block can satisfy the predicate of the database query, the database system skips this block and moves on to the next block in order until the database system finds a block that comprises one or more rows that satisfy the predicate.

Step 5061 is executed after step 5050, where it is determined that there is a current block to be processed. In step 5061, it is determined whether there is a qualified next block to be processed based on the metadata. In some embodiments, the database system uses the location information of the current block in the metadata to find a next block and determines if the next block can be determined as a qualified next block. The qualified next block is determined if the next block comprises one or more rows that satisfy the predicate of the database query based on the metadata. In some embodiments, the determination of the qualified next block based on the metadata can be similar to the determination of the current block in step 5032. For example, as shown in FIG. 3, the database query has a predicate of "Salary>40000." If data is organized in a row-column hybrid storage format as shown in FIG. 2, the database system can obtain statistical information for the salary column of a next block row group 2. The statistical information for the salary column may include a maximum value of 33000 and a minimum value of 66000. The database system can then determine that there are one or more rows in row group 1 that satisfy the predicate "Salary>40000" because the maximum value is larger than 40000. If the database query has a predicate of "Salary>95000" instead of "Salary>40000," then the database system can determine that there are no rows in row group 1 that satisfy the predicate because the maximum value is smaller than 95000.

If the database system determines that there are one or more rows in the next block that satisfy a predicate of the database query, the database system can then make the next block as the qualified next block and execute step 5063 to prefetch the qualified next block. If the database system determines that there are no rows in the block that satisfy the predicate of the database query, the database system moves on to the next block in order until the database system finds a block that comprises one or more rows that satisfy the predicate. If the database system cannot find a qualified next block, the database system executes step 5062.

On top of the advantages offered by method 5000 of FIG. 5 and method 5100 of FIG. 6, method 5200 of FIG. 8 has an additional advantage in that method 5200 can take advantage of metadata for each column inside the blocks to determine whether a block is worth prefetching in the first place. According to method 5200, database systems can first use metadata to determine whether a block comprises one or more rows that satisfy a predicate of the database query. This determination allows the database system to skip blocks that are not relevant to the execution of the database query. Skipping blocks that are not relevant is especially critical in database systems where blocks are stored across different storage disks. Being able to skip a block that is not relevant can reserve valuable I/O and computing resources used in prefetching data across different storage disks in the database system. As a result, the processing efficiency for reading and prefetching operations when executing database queries can be improved significantly.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method for prefetching data in a database, the method comprising:

receiving a database query on the database;

determining a plurality of sets of adjacent columns accessed by the database query, comprising grouping one or more immediately adjacent columns in a table into a respective set of the plurality of sets of adjacent columns; and while processing data from a first column of a first set of the plurality of sets of adjacent columns, prefetching data from one or more other columns of the first set of adjacent columns, or prefetching data from a second set of the plurality of sets of adjacent columns, wherein the data is processed in response to the database query.

2. The method of claim 1, wherein the database query comprises a plurality of projections of columns, and the plurality of sets of adjacent columns are determined according to the plurality of projections of columns.

3. The method of claim 1, wherein the database query comprises a scan operation.

4. The method of claim 1, wherein the database comprises a row-column hybrid storage database comprising blocks of data, wherein a block of data of the blocks of data comprises some or all data of each column in the database and rows in a block of data of the blocks of data are stored column by column.

5. The method of claim 4, further comprising:
determining if there is a current block to be processed;
in response to a determination that there is a current block to be processed, reading each set of adjacent columns in the current block;
determining if there is a next block to be processed, wherein the next block is located next to the current block in the database; and
in response to a determination that there is a next block to be processed, prefetching data in each set of adjacent columns in the next block; and
setting the next block as the current block.

6. The method of claim 5, further comprising:
processing metadata of the blocks to determine if there is a current block to be processed; and
processing metadata of the blocks to determine if there is a next block to be processed.

7. The method of claim 6, wherein:
processing metadata of the blocks to determine if there is a current block to be processed further comprising determining if a block has data that qualifies a predicate of the database query based on the metadata of the block; and
processing metadata of the blocks to determine if there is a next block to be processed further comprising determining if a block has data that qualifies a predicate of the database query based on the metadata of the block.

8. The method of claim 1, wherein prefetching data in the adjacent columns further comprises:
prefetching data in the adjacent columns using a system call of an operating system on the database system.

9. A database system, comprising:
a memory storing a set of instructions; and
a processor configured to execute the set of instructions to cause the database system to:
receiving a database query on the database;
determining a plurality of sets of adjacent columns accessed by the database query, comprising grouping one or more immediately adjacent columns in a table into a respective set of the plurality of sets of adjacent columns; and
while processing data from a first column of a first set of the plurality of sets of adjacent columns, prefetching data from one or more other columns of the first set of adjacent columns, or prefetching data from a second set of the plurality of sets of adjacent columns, wherein the data is processed in response to the database query.

10. The database system of claim 9, wherein the database query comprises a plurality of projections of columns, and the plurality of sets of adjacent columns are determined according to the plurality of projections of columns.

11. The database system of claim 9, wherein the database is a row-column hybrid storage database comprising blocks of data, wherein a block of data of the blocks of data comprises some or all data of each column in the database.

12. The database system of claim 11, wherein the processor is further configured to cause the database system to:
determine if there is a current block to be processed;
in response to a determination that there is a current block to be processed, read each set of adjacent columns in the current block, and determine if there is a next block to be processed, wherein the next block is located next to the current block in the database; and
in response to a determination that there is a next block to be processed, prefetch data in each set of adjacent columns in the next block and setting the next block as the current block.

13. The database system of claim 12, wherein the processor is further configured to cause the database system to:
in determining if there is a current block to be processed, determine if a block has data that qualifies a predicate of the database query based on metadata of the block; and
in determining if there is a next block to be processed, determine if a block has data that qualifies a predicate of the database query based on metadata of the block.

14. The database system of claim 9, wherein the processor is further configured to cause the database system to:
prefetch data in the adjacent columns using a system call of an operating system on the database system.

15. A non-transitory computer readable medium that stores a set of instructions that is executable by one or more processors of a database system to cause the database system to initiate a method comprising:
receiving a database query on the database;
determining a plurality of sets of adjacent columns accessed by the database query, comprising grouping one or more immediately adjacent columns in a table into a respective set of the plurality of sets of adjacent columns; and
while processing data from a first column of a first set of the plurality of sets of adjacent columns, prefetching data from one or more other columns of the first set of adjacent columns, or prefetching data from a second set of the plurality of sets of adjacent columns, wherein the data is processed in response to the database query.

16. The non-transitory computer readable medium of claim 15, wherein the database query comprises a plurality of projections of columns, and the plurality of sets of adjacent columns are determined according to the plurality of projections of columns.

17. The non-transitory computer readable medium of claim 15, wherein the database is a row-column hybrid storage database comprising blocks of data, wherein a block of data of the blocks of data comprises some or all data of each column in the database.

18. The non-transitory computer readable medium of claim 17, wherein the set of instructions that is executable by one or more processors of the database system to cause the database system to further perform:

determining if there is a current block to be processed;

in response to a determination that there is a current block to be processed, reading each set of adjacent columns in the current block, and determining if there is a next block to be processed, wherein the next block is located next to the current block in the database; and in response to a determination that there is a next block to be processed, prefetching data in each set of adjacent columns in the next block and setting the next block as the current block.

19. The non-transitory computer readable medium of claim 18, wherein the set of instructions that is executable by one or more processors of the database system to cause the database system to further perform:

when determining if there is a current block to be processed, determining if a block has data that qualifies a predicate of the database query based on metadata of the block; and when determining if there is a next block determining if a block has data that qualifies a predicate of the database query based on a metadata of the block.

20. The non-transitory computer readable medium of claim 15, wherein the set of instructions that is executable by one or more processors of the database system to cause the database system to further perform:

prefetching data in the adjacent columns using a system call of an operating system on the database system.

* * * * *